D. R. LASIER
Dec. 15, 1931. FUSIBLE TYPE HOLD-OPEN ARM Re. 18,284
2 Sheets-Sheet 1
Original Filed March 5, 1929
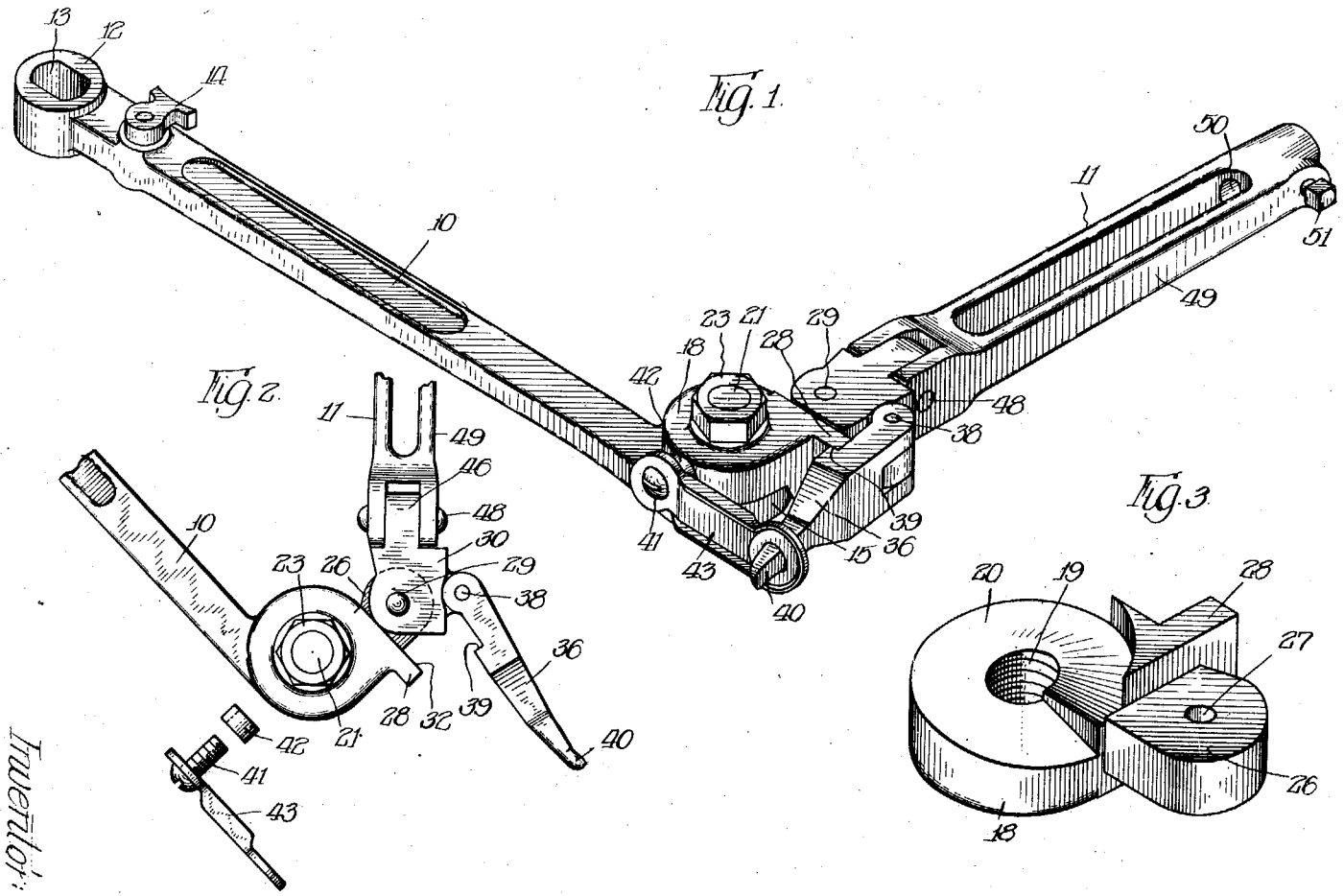
Inventor:
David R. Lasier,
By Wilkinson, Huxley, Byron & Knight
Attys D. R. LASIER
Dec. 15, 1931.
FUSIBLE TYPE HOLD-OPEN ARM
Re. 18,284
2 Sheets-Sheet 2
Original Filed March 5, 1929
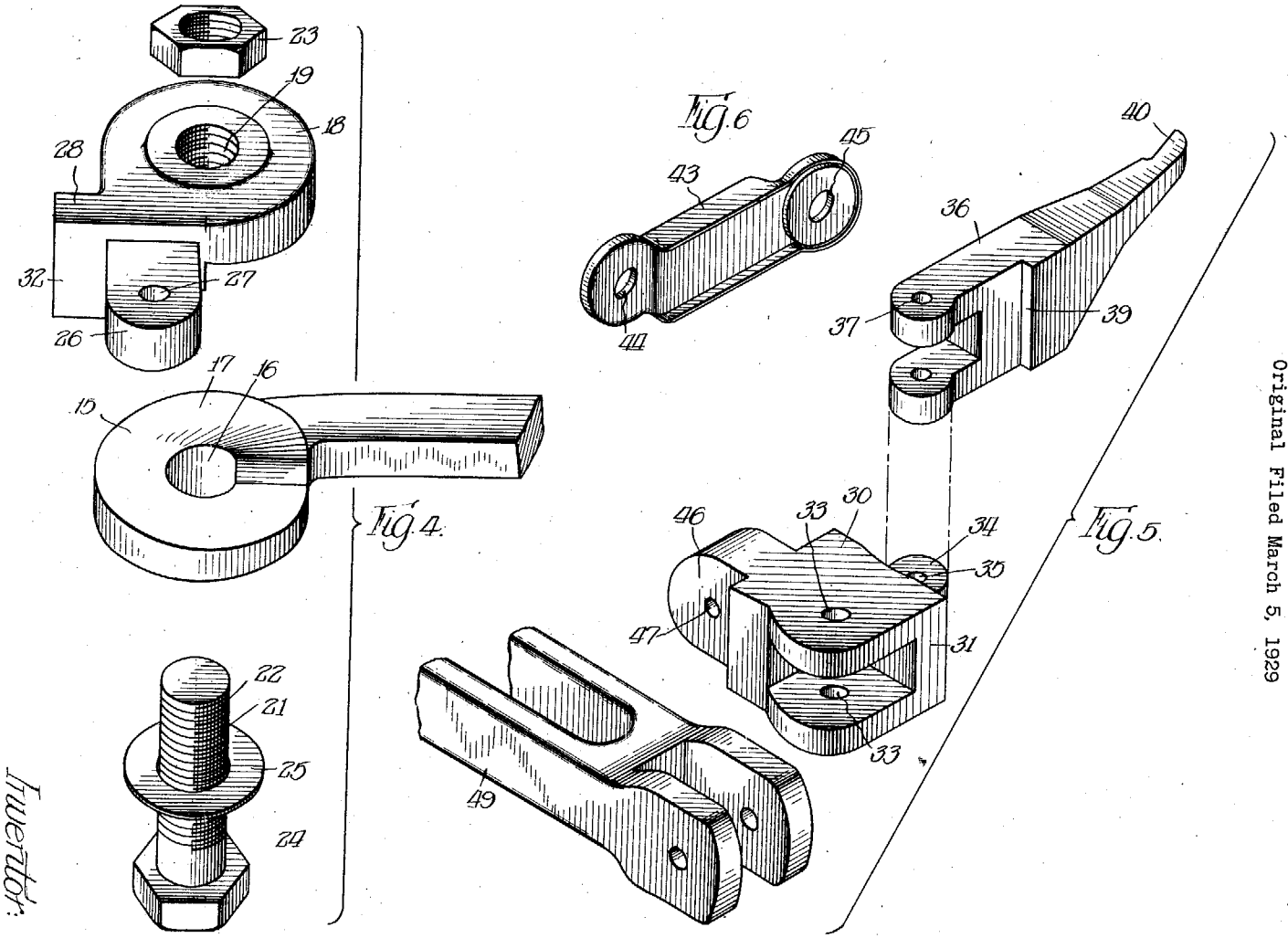
Inventor:
David R. Lasier,
By Wilkinson, Huxley, Byron & Knight
Attys.

Reissued Dec. 15, 1931 Re. 18,284

UNITED STATES PATENT OFFICE

DAVID R. LASIER, OF CHICAGO, ILLINOIS, ASSIGNOR TO NORTON-LASIER COMPANY, OF CHICAGO, ILLINOIS, A CORPORATION OF ILLINOIS

FUSIBLE TYPE HOLD OPEN ARM

Original No. 1,812,408, dated June 30, 1931, Serial No. 344,213, filed March 5, 1929. Application for reissue filed September 3, 1931. Serial No. 561,059.

This invention relates to holding devices of the type usually applied to doors, windows and similar closure means, for holding the door, window or similar means in a predetermined open position, and to holding devices which are affected under conditions of temperature above, by a predetermined amount, the highest atmospheric temperature to which the device will be exposed, to render the holding means ineffective whereby the closure means held open by the device will be free to swing or move to its closed position, in the event of accidental occurrence of fire.

An object of this invention is to provide a novel device adapted to be operatively connected between a stationary part and the closure means such as for instance, between the door sill and door, and operative to automatically hold the closure means in any desired predetermined open position when the closure means is moved and urged into said position, and to release the closure means when the device is exposed to a predetermined temperature.

Another object of this invention is to provide a novel form of holding means, which is simple in operation and construction and highly efficient in service and one in which the release is accomplished without disturbing the holding parts.

Another object is to provide a novel holding device equipped with temperature responsive means, such as a fusible link for controlling the releasing mechanism, whereby exposure to a predetermined temperature will cause the release, and consequent closing of the closure means.

In the illustrated form of this invention, the holding device is disclosed as a pair of pivoted links or arms, having holding friction faces of substantially the construction shown in applicant's co-pending application, Serial No. 190,427, filed May 11th, 1927, for improvements in door holding arms but it is to be understood that the holding mechanism may be located at any one of the pivots, that is to say, either at the pivot between the links as shown, at the pivot between one of the links and the door sill or at the pivot between the other link and the door.

It is obvious that for its successful operation, the holding device requires merely a relative movement between co-operating parts, the relative movement between which is caused by the opening and closing of the door, and therefore, as this condition exists at any one of the pivots, any one of these locations will serve. In fact, certain of these locations have advantages over certain of the other locations, under particular circumstances, such as the number of degrees of swing of the door, location at which holding is desired and the use or nonuse of door closing and checking devices with the holding device, etc., and accordingly the invention is not to be limited by the disclosure in this particular, as all of the various locations are contemplated for the holding mechanism.

Also the particular type of holding mechanism may vary within limits as this invention relates to the combination of a suitable holding mechanism and releasing mechanism for rendering the holding mechanism inoperative, and consequently any suitable holding mechanism may be employed.

It is to be further understood that the releasing mechanism is to be located in close proximity to the pivot at which the holding means is located so as to serve as a substitute pivot therefor in the event the releasing mechanism is brought into operation. Furthermore, that the device contemplated be used either with or without door closing and checking devices.

Various objects not specifically enumerated and in addition to those above mentioned, will readily appear to anyone skilled in the art to which this invention pertains, as the following description proceeds.

The disclosure is to be considered merely as one embodiment of this invention which is given only by way of example and the scope of the invention is to be determined from a complete understanding of this disclosure, and an appreciation of the advantages which the invention produces in this illustrative form.

The invention will be more readily understood by referring to the accompanying drawings in which—

Figure 1 is a perspective view of a holding device constructed in accordance with this invention;

Figure 2 is a plan view of the construction shown in Figure 1, with the parts thereof in displaced positions to better show their construction and operation.

Figures 3, 4 and 5 are enlarged perspective views of parts of the device shown in Figure 1, disclosing the construction and arrangement, and Figure 6 is an enlarged view of the fusible link employed in Figure 1.

By referring to the drawings, it will be noted that my invention is illustrated as applied to a door holding device comprising a pair of links 10 and 11 which with the exception of the improvements contemplated in this invention, are similar in construction to the holding device disclosed in the applicant's co-pending application above referred to and which are adapted to be mounted in the manner disclosed therein.

The parts which are not essential to a complete understanding of this invention have been omitted from the drawings and description as they are disclosed as constructed and mounted in the manner shown in the co-pending application where the construction and mounting are completely shown in detail.

Accordingly, the link 10 is provided with a head 12 having an opening 13 adapted to be connected to a door check. The lug 14 is provided for connecting the arm with the door check in the usual manner. At the opposite end of the arm 10, a head 15 is provided, better shown in Figure 4, having the center pivot opening 16 and the spiral friction face 17. Pivoted to and cooperating with the end of the arm 10, is the element 18, shown in Figures 3 and 4, having the threaded opening 19 and spiral face 20. The friction face 20 is adapted to cooperate with the friction face 17 whereby upon relative oscillation of these two parts the outer surfaces of the head 15 and the element 18 will separate and approach each other.

Positioned through the pivot opening 16 is the bolt 21 provided with the threaded end 22 adapted for threaded engagement with the opening 19 in the element 18. The bolt is of such length that the end thereof will project above the element 18 when the parts are in operative position so as to receive the lock nut 23 on the end thereof.

Positioned between the head 24 of the bolt and the outside face of the head 15, is the washer 25. It will be appreciated that when the bolt is positioned through the head 15 and the element 18 so as to form a pivot bearing therefor, that angular movement of the element 18 relative to the head 15, in one direction, will cause a binding of the parts due to the fact that, according to the particular adjustment of the bolt, only a limited clearance is provided for the expansion movement. In this manner by properly adjusting the bolt, so as to provide a predetermined clearance, the element 18 and head 15 can be brought into a binding engagement at any predetermined angular position.

The particular adjustment of the bolt, is maintained at all times by the locking effect of the nut 23. When the device is installed, the element 18 is connected by mechanism hereinafter described to either the door or door sill and the head 15 carried on the arm 10 is pivotally connected to the other of said parts and the bolt is adjusted to produce the binding of the friction faces in that position of the head 15 and element 18 at which it is desired to hold the door.

Except insofar as the element 18 being an independent part pivotally connected to the arm 11, instead of being rigid therewith, the operation and construction of the device above given is substantially like that of the co-pending application above referred to.

The element 18 is provided with a pivot lug 26, having the pivot opening 27 and in addition, a locking lug 28. Pivotally connected by means of a pin 29, to the pivot lug 26, is the element 30. This element is provided with a straight faced portion 31, adapted to abut the surface 32 of the locking lug 28 on the first element so as to prevent pivotal movement between these parts in one direction. The element 30 cooperates with the pivot pin 29 by means of the pivot opening 33. The element 30 is provided on one side, with the pivot lug 34 having the opening 35 for pivotally receiving the locking dog 36, secured thereto by means of the pivot bearings 37 and pivot pin 38.

The locking dog is provided with a shoulder 39 and an extended nose 40. Secured to the element 18 by means of the screw 41 and bushing 42 is a fusible link 43 having the opening 44 at one end through which the screw extends and the opening 45 at its other end adapted to fit over and engage the nose 40 of the locking dog 36. The length of the fusible link is such that the link holds the locking dog in intimate engagement with the locking lug 28 in the manner shown in Figure 1. The various parts are so constructed that when the locking dog is in engagement with the lug 28 as shown in Figure 1, the flat face portion 31 of the element 30 is in close contact with the face 32 on the lug 28. Consequently when the parts are in assembled position as shown in Figure 1, the element 18 is held rigidly to the element 30 whereby in effect these parts are a single rigid member.

The element 30 is in addition provided with a pivot lug 46, having a pivot opening 47 adapted to receive by means of the pivot pin 48, the portion 49 of the link 11. Portion 49 is provided with an opening 50 and locking screw 51 adapted to adjustably receive a rod constructed at its opposite end for abutment to either the door or the door sill as the case may be. This part is not shown as it is of the same construction as that shown in the applicant's co-pending application.

In operation, the holding device is mounted in the customary manner with the parts arranged as shown in Figure 1 whereby the elements 18 and 30 will be rigidly held together in a manner to cause these parts to function as a unitary arm or link. In this event, the holding device comprising the cooperating friction faces functions in the manner of the device in the co-pending application, acting to hold the door in any predetermined open position according to the particular adjustment of the pivot bolt 21.

In the event of fire, such that the fusible link 43 will be fused, the portions of the link will become separated leaving the locking dog 39 free to disengage the lug 28. Under such circumstances, even though the friction faces are firmly bound, in a manner to hold the door, the independent pivot provided on the pin 29 acts as a substitute pivot and permits the arms to be pivoted relative to each other whereby the door is free to swing shut.

If the device is used in combination with a door closing mechanism, whether of the checking type or any other type, this mechanism will urge the door shut in the desired manner. It is of course understood that devices of this kind are employed, because in the event of fire, it is desirable to shut off from other portions of the building, that portion which is affected by the fire.

The fusible link 43 is not described in detail because no claim is made to the link per se except as a part of the combination herein defined, and the fusible link construction here disclosed is old and well known.

It is obvious that the invention has application on all sorts of closures such as floors, windows, and the like and that the device when installed, is connected to the closure such as a door at one end and to a stationary part, such as the sill at its other end and accordingly, the invention is to be construed broadly and as covering all such installations. However, for the purpose of clarity, the applicant has defined his device as connected between a door and door sill but these terms are to be considered as covering any similar means.

The scope of the invention will be readily determined by referring to the appended claims.

I claim:

1. A holding device adapted to be pivotally connected between a door and door sill respectively, comprising in combination, a link having a friction face at one end, an element having a cooperating friction face pivotally connected to the end of said link, a second element pivoted to said first element, on an axis parallel with the pivotal axis between said link and first element, a lug on said first element, a dog pivoted to said second element, adapted for locking engagement with said lug, and a fusible link for holding said dog in engagement with said lug.

2. A holding device adapted to be pivotally connected between a door and door sill respectively, comprising in combination, a link having a friction face at one end, an element having a cooperating friction face pivotally connected to the end of said link, a second element pivoted to said first element, on an axis parallel with the pivotal axis between said link and first element, a lug on said first element, a dog pivoted to said second element, adapted for locking engagement with said lug, and a fusible link secured to said first element and engaging the end of said dog.

3. A holding device adapted to be pivotally connected between a door and door sill respectively, comprising in combination a link having a friction face at one end, an element having a cooperating friction face pivotally connected to said link, a second element pivoted to said first element, on an axis parallel with the pivotal axis between said link and first element, means for holding the pivot between said first and second elements normally inactive, comprising a holding member pivotally mounted on one of said elements and extending to and having holding engagement with the other of said elements, and a fusible link for normally maintaining said member in holding relationship.

4. A holding device adapted to be pivotally connected between a door and door sill respectively, comprising in combination, a link having a friction face at one end, an element having a cooperating friction face pivotally connected to the end of said link, a second element pivoted to said first element on an axis parallel with the pivotal axis between said link and first element, a dog pivoted to one of said elements having a portion adapted for holding engagement with the other of said elements, and a fusible link for normally holding said dog in holding position.

Signed at Chicago, Illinois, this 1 day of September, 1931.

DAVID R. LASIER.